Jan. 31, 1950 — T. M. JABLON — 2,496,008
MOUNTING FOR TRANSPARENCY SLIDES
Filed May 13, 1946

INVENTOR.
Theodore M. Jablon

Patented Jan. 31, 1950

2,496,008

UNITED STATES PATENT OFFICE 2,496,008

MOUNTING FOR TRANSPARENCY SLIDES

Theodore M. Jablon, New York, N. Y.

Application May 13, 1946, Serial No. 670,048

8 Claims. (Cl. 40—158)

This invention relates to mountings for transparency slides to be used in still projectors or viewers.

More specifically this relates to slide mountings for film transparencies, for instance the well known 35 mm. color transparencies.

Such color slide film transparencies are usually supplied mounted in a light cardboard frame in which they are capable of being inserted into a projector, although the film itself remains relatively unprotected.

However, where special protection of the film proper is desired, such a frame-mounted film transparency requires being mounted or remounted between protective transparent plates or glass plates. When mounting the film between glass plates it is desirable to have the film in face-to-face contact relationship with the plates, whereby the film is maintainable substantially flat between the plates and whereby an air space between the film and the protective plate is substantially avoided or reduced to a minimum.

It is a more specific object of this invention to provide a face-to-face contact transparent plate mounting applicable directly to a frame-mounted film transparency, that is without requiring the removal of the transparency proper from the frame.

In order to attain this end, this invention proposes to provide a protective transparent or glass plate for each side of the transparency, the plate to be of a size to fit into the recess or shallow depression formed by each face of the film with the surrounding frame, and to apply means for marginally holding the plates in their recesses.

According to one feature a relatively thin auxiliary frame having a frame opening slightly smaller than the recess is adhered to each face of the transparency holding frame so as to overlie the plate with a correspondingly narrow holding margin.

More specifically, where the protective plate be of a slightly greater thickness than the depth of the recess, the auxiliary frame is then provided with a corresponding recess or shoulder along the edge of its opening to receive the excess thickness of the plate.

It is among the advantages of this invention that the film transparency need not be dismounted from its frame and thereby be subject to handling and damage, that it need not be centered and aligned in the process of re-mounting between protective transparent plates, that the thickness of the finished mounting is reduced to a minimum due to the absence of air space between the plates and the film, that the weight of the finished mounting is reduced to a minimum because of the reduced size of the glass plate, that the assembly of the component parts is facilitated since each glass plate locates itself in its recess, while the auxiliary or holding frame in turn locates itself upon that portion of the plate thickness that is raised above the face of the transparency holding frame.

The invention possesses other objects and features of advantage, some of which with the foregoing will be set forth in the following description. In the following description and in the claims, parts will be identified by specific names for convenience. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is an exploded perspective view of the component elements of the mounting;

Figure 1:
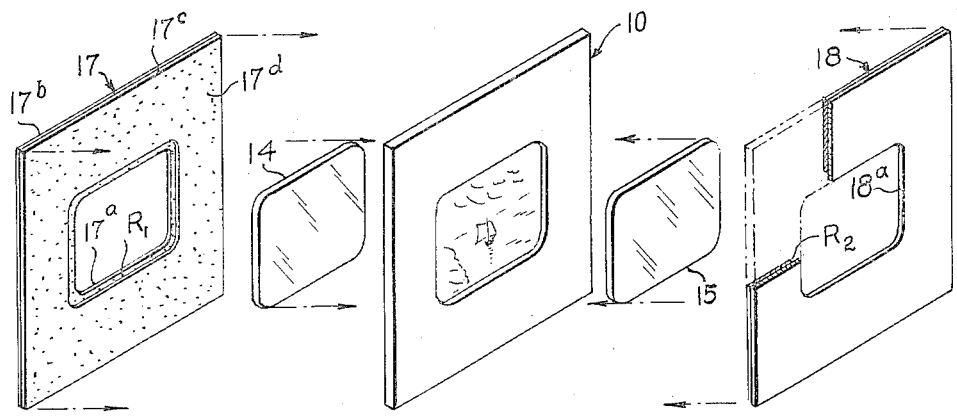
Figure 2:
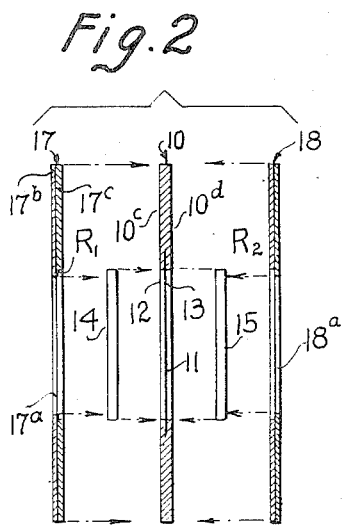
Fig. 2 is an exploded sectional view of the component elements of the mounting.
Figure 3:
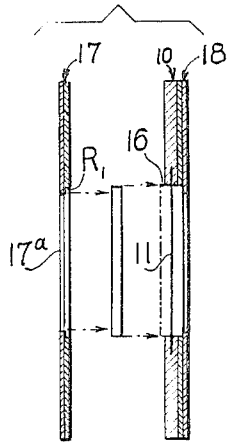
Fig. 3 is a partly exploded sectional view of the mounting.
Figure 4:
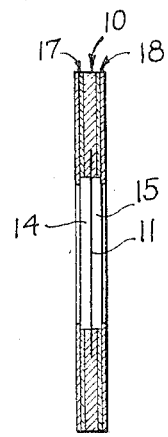
Fig. 4 is a sectional view of the finished mounting.
Figure 5:
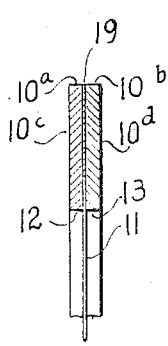
Fig. 5 shows more in detail how the holding frame itself is constructed.

The transparency holding frame 10 is here shown by way of example to be a cardboard frame consisting in effect of two halves $10^a$ and $10^b$ adhered to one another and having respective outer faces $10^c$ and $10^d$ and having confined between them a film transparency 11 so that the faces thereof form with the openings of the respective halves $10^a$ and $10^b$ of the frame recesses or shallow depressions 12 and 13 respectively. Into these recesses fit respective transparent or glass plates 14 and 15 shown to be of a thickness somewhat in excess of the depth of the recesses, such excess thickness being indicated as at 16 (Fig. 3). Over each glass plate thus seated in its recess fits marginally a holding frame 17 and 18 respectively by way of a recess or shoulder $R_1$ and R₂ respectively extending along the edge of their respective frame openings 17ᵃ and 18ᵃ. Such a shoulder is shown to be created for instance in the auxiliary or holding frame 17 by a composite structure having one component layer 17ᵇ provided with an opening slightly smaller than the size of the respective glass plate, and another layer 17ᶜ having an opening of a size to fit over the glass plate, both layers 17ᵇ and 17ᶜ being adhered to or bonded with one another. The free face 17ᵈ of the layer 17ᶜ in turn may be gummed for adhesion to the corresponding face 10ᶜ of the frame, or adhesive-conditioned as indicated by the stippling of the face. The other auxiliary holding frame 18 may be similarly constructed and applied to the corresponding face 10ᵈ after the plate 15 has been lodged in its recess 13 of the transparency holding frame 10.

In the transparency holding frame 10, two halves or component frame members 10ᵃ and 10ᵇ are matched upon one another and cemented together by way of an interposed thin spacer frame 19, allowing the film transparency 11 to be accommodated between the halves 10ᵃ and 10ᵇ.

I claim:

1. A glass plate protected film transparency comprising a film, a two-part frame in which the film is held marginally between the two parts so that each face of the film forms with its adjacent frame portion a shallow recess, characterized by a pair of protective glass plates one of which is inserted in each recess, and means associated with the frame for marginally retaining each glass plate in its recess.

2. A glass plate protected film transparency according to claim 1, in which the marginal retaining means comprise an auxiliary frame having a light passage opening the inner margin of which overlies the outer margin of one of the glass plates.

3. A glass plate protected film transparency according to claim 1, in which each glass plate is thicker than its recess is deep so that a portion of its thickness protrudes outwardly from the recess, and in which the marginal retaining means comprise for each glass plate an auxiliary frame having a light passage opening provided with a marginal recess extending along the edge of said opening and receiving the protruding portion of the thickness of the glass plate.

4. A glass plate protected film transparency comprising a film, a two-part frame in which the film is held marginally between the two parts so that each face of the film forms with its adjacent frame portion a shallow recess, characterized by a protective glass plate inserted in one of said recesses for protecting the emulsion side of the film, which glass plate is thicker than the recess is deep so that a portion of its thickness protrudes outwardly from the recess, and an auxiliary frame associated with the first mentioned frame for retaining said glass plate in its recess, said auxiliary frame having a light passage opening provided with a marginal recess extending along the edge of said opening and receiving the protruding portion of the thickness of the glass plate.

5. A protective glass plate mounting for a film transparency marginally held between the two parts of a two-part frame so that each face of the film forms with its adjacent frame portion a shallow recess, characterized by a pair of protective glass plates one of which is insertable in each recess, and means adapted to be associated with said frame for marginally retaining each glass plate in its recess.

6. A protective glass plate mounting according to claim 5, in which the marginal retaining means comprise an auxiliary frame having a light passage opening the inner margin of which overlies the outer margin of the glass plate.

7. A protective mounting according to claim 5, in which each glass plate is thicker than its recess is deep so that a portion of its thickness is adapted to protrude outwardly from the recess, and in which the marginal retaining means comprise for each glass plate an auxiliary frame having a light passage opening provided with a marginal recess extending along the edge of said opening and adapted to receive the protruding portion of the thickness of the glass plate.

8. A protective glass plate mounting for a film transparency marginally held between the two parts of a two-part frame so that each face of the film forms with its adjacent frame portion a hollow recess, characterized by a protective glass plate insertable in one of said recesses for protecting the emulsion side of the film, which glass plate is thicker than its recess is deep so that a portion of its thickness is adapted to protrude outwardly from the recess, and an auxiliary frame adapted to be associated with the first mentioned frame for retaining said glass plate in its recess, said auxiliary frame having a light passage opening provided with a marginal recess extending along the edge of said opening and adapted to receive the protruding portion of the thickness of the glass plate.

THEODORE M. JABLON.

REFERENCES CITED

The following references are of record in the file of this patent:

UNITED STATES PATENTS

| Number | Name | Date |
|---|---|---|
| 1,309,183 | Cochrane | July 8, 1919 |
| 1,467,108 | Hodgson | Sept. 4, 1923 |
| 1,498,895 | Theriault | June 24, 1924 |
| 1,500,025 | Mayer | July 1, 1924 |
| 2,164,655 | Kleerup | July 4, 1939 |
| 2,256,399 | Mac Harg | Sept. 16, 1941 |
| 2,291,173 | Simpson | July 28, 1942 |

FOREIGN PATENTS

| Number | Country | Date |
|---|---|---|
| 677,494 | Germany | June 27, 1939 |